United States Patent [19]
Fitzpatrick

[11] Patent Number: 6,136,423
[45] Date of Patent: Oct. 24, 2000

[54] FIRE FIGHTING APPARATUS

[76] Inventor: Peter J. Fitzpatrick, 467 Kearney Ave., Kearney, N.J. 07032

[21] Appl. No.: 09/255,002

[22] Filed: Feb. 22, 1999

Related U.S. Application Data

[63] Continuation-in-part of application No. 08/584,376, Jan. 11, 1996, Pat. No. 5,874,138.
[51] Int. Cl.[7] .................................................. B32B 3/26
[52] U.S. Cl. .................................... 428/304.4; 428/305.5; 428/308.4
[58] Field of Search ............................. 428/304.4, 305.5, 428/308.4

[56] References Cited

U.S. PATENT DOCUMENTS

| | | |
|---|---|---|
| 3,729,879 | 5/1973 | Franklin . |
| 3,802,145 | 4/1974 | Scanlon . |
| 4,155,482 | 5/1979 | Swaney . |
| 5,461,838 | 10/1995 | Heller . |

*Primary Examiner*—Rich Weisberger
*Attorney, Agent, or Firm*—Clark & Brody

[57] ABSTRACT

A ceiling tile contains a plurality of shells made of a thin membrane and filled with fire retardant materials. When the shells are subjected to high temperatures, as when a fire is present in the room, the shells burst and release the fire retardant materials to extinguish the fire.

8 Claims, 1 Drawing Sheet

FIRE FIGHTING APPARATUS

CROSS REFERENCE TO RELATED INVENTION

This application is a continuation-in-part of application Ser. No. 08/584,376, which was filed on Jan. 11, 1996, now U.S. Pat. No. 5,874,138 the disclosure of which is incorporated by reference.

BACKGROUND OF THE INVENTION

This invention relates to articles used for extinguishing fires and, in particular to ceiling tiles used for that purpose. The ceiling tiles may be of virtually any size and shape, and the invention is directed more specifically to the types of ceiling tiles used for drop ceilings or those cradled in frame-like structures or are stapled or glued to a ceiling.

DESCRIPTION OF PRIOR ART

The purpose of this invention is to provide a unique device for fighting, or extinguishing, a fire inside any building, such as in the home or office. Fire fighting apparatus that are attached to the ceiling of a building are known in the prior art and include water sprinklers and the like, but these apparatus are known to require significant time and/or heat to become activated, thereby giving the fire time to become extremely hot and, therefore, more difficult to extinguish.

SUMMARY OF THE INVENTION

The known methods of fighting a fire inside a building include fire extinguishers containing various chemicals, as well as water and, of course, the popular sprinkler system for fire fighting. However, most sprinkler heads must sense a temperature of 200° F., or more, before activation occurs, and then what is not destroyed by fire will be destroyed by water in that room or floor of the building, followed by destruction by water of the rooms and floors below and adjacent to the fire.

The present invention contemplates a fire-fighting apparatus that can be utilized independently or in conjunction with any of the known fire fighting apparatus, including those mentioned above.

The instant invention, comprises a flat, tile-like or panel-like surface, which can be glued or stapled in an interlocking manner, or separately, to a ceiling or to the roof of a closet or affixed to the inside of the cover of a trash can or a wall, etc. The panels have affixed thereto by gluing or other means, such as by stapling, a sufficient number of spheres or shells, to cover the surface thereof. These shells or spheres should have a wall thickness of about 0.01 inch, or about 0.2540 mm, and a diameter of about 1 inch, or about 25 mm, and be constructed of a very light membrane of plastic, rubber, or other materials, such as synthetic materials and paper impregnated with glue or other means and be filled with fire retardant chemicals, which are released when a minimum predetermined amount of heat causes the shells to burst, allowing the fire retardant to rain down and abort the fire below, thereby preventing what would be major water damage to the property directly underneath and on both sides.

BRIEF DESCRIPTION OF THE INVENTION

DETAILED DESCRIPTION OF THE PREFERRED EMBODIMENT

Figure 1:
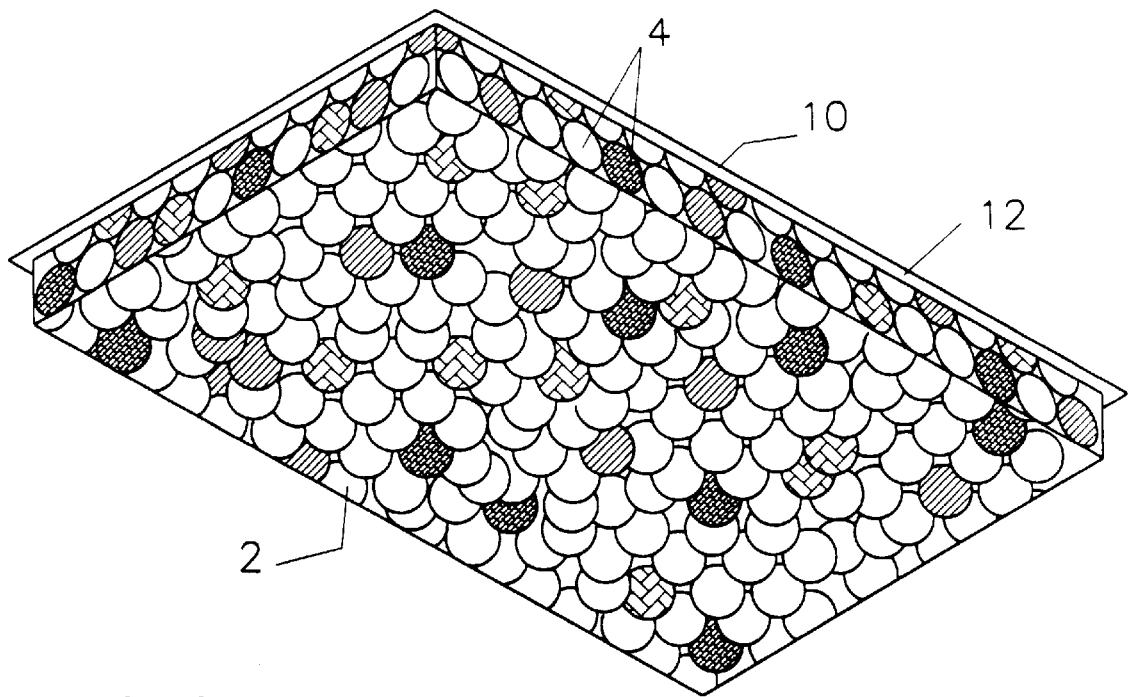
FIG. 1 is a perspective view from below of a panel having fire-extinguishing spheres thereon in accordance with the invention.
Figure 2:
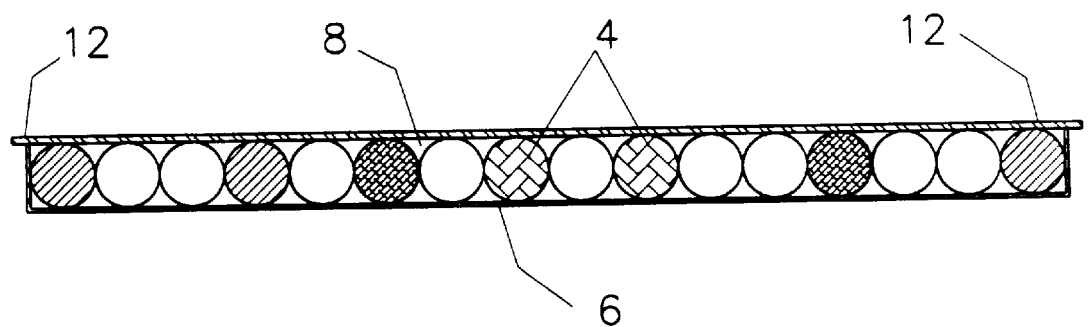
FIG. 2 is a side view of the embodiment of the invention shown in FIG. 1.

With reference to FIG. 1, a primary component of the preferred embodiment of the invention is a shell 2, that can be spherical and is preferably constructed of a very thin membrane of plastic, rubber, or paper treated with fire retardant chemicals. The thickness of the membrane wall is preferably about 0.01 inch or about 0.0254 mm, and the diameter of the sphere is preferably about one inch or about 25 mm. Each of the shells is filled with a fire retardant chemical 4. These shells are attached to a platform 8, which forms a ceiling tile 10. The ceiling tile can be attached to a ceiling by adhesive, nails, staples or other means. The tile may also be suspended beneath a ceiling by a flange 12 of a known framework that engages the edges of the tiles and is itself supported from the ceiling by wires or the like.

While the tiles 10 having shells 2 filled with flame-retardant chemicals are preferably used for ceiling tiles, they may be attached to a variety of surfaces such as vertical walls, and may be used for various enclosures, such as closets, trash containers, etc.

The tiles may also have a decorative membrane attached to the bottom of the shells, such as that shown at 6, to hide or disguise the shells. The membrane 6 must be very thin whereby it will not affect transmission of heat from a fire below the tiles and made of a material that easily gives way to high temperatures so that it will not interfere with discharge of the fire retardant chemicals. In some instances, it may be desirable for the membrane to provide some of the support to the shells. Thus, in this embodiment, the membrane 6 would assist the glue or other elements holding the individual shells to the tile and would release the shells from the tile in response to a predetermined temperature. At the same time, the shells would rupture and release the fire retardant materials. Or, the membrane 6, or the glue holding the shells to the tile, could release the shells before the shells themselves burst to allow the shells to be closer to the fire when they burst.

The membrane 6 may cover all of the shells and thus the entire bottom surface of the collection of shells, or it may be smaller and cover only a portion of the shells. For example, the membrane 6 may be a narrow, string-like, element that is attached along the bottoms of the individual shells.

In operation, heat from a fire beneath the tiles will raise the temperature of the thin shell material and cause the shell membrane to rupture. The fire retardant material will then fall from the burst shells and extinguish the fire.

The shells 2 do not need to be the same sizes and the same shapes. Thus, some may be larger than others and some may be rectangular, oval, octagonal or any other shape. As well, the thickness of the shells can vary among the shells. Thus, some of the shells can have thinner membranes and thus be more sensitive to temperature than others. Further, the shells do not have to all contain the same fire retardant material, e.g., some of the retardant materials can be liquid and others solid, or powdered. Different shells containing different materials can respond differently to elevated temperatures, such as, for example, to provide delayed responses for particular types of retardant materials.

Modifications within the scope of the appended claims will be apparent to those of skill in the art.

I claim:

1. Apparatus for fighting a fire comprising a tile having a plurality of shells thereon, each of said shells having a heat absorbing wall capable of rupture at a predetermined temperature and being filled with a fire-retardant material, which, when released, aborts the fire.

2. Apparatus according to claim 1 further comprising a decorative membrane covering said shells on a surface opposite said tile.

3. Apparatus according to claim 2 wherein said decorative membrane covers substantially all of said shells.

4. Apparatus according to claim 1 wherein a lower surface of said tile is covered with said shells.

5. Apparatus according to claim 1 wherein a first group of said shells contains a first fire retardant material and a second group of said shells contains a second fire retardant material.

6. Apparatus according to claim 1 wherein each of said shells comprise a membrane having a wall thickness of about 0.001 inch.

7. Apparatus according to claim 1 wherein said predetermined temperature is 140° F.

8. Apparatus according to claim 1 further comprising a decorative membrane attached to the bottoms of said shells.

* * * * *

UNITED STATES PATENT AND TRADEMARK OFFICE
CERTIFICATE OF CORRECTION

PATENT NO. : 6,136,423
DATED : October 24, 2000
INVENTOR(S) : Peter J. Fitzpatrick It is certified that error appears in the above-identified patent and that said Letters Patent are hereby corrected as shown below:

Column 1, line 52, "0.01" should be -0.001-;
Column 1, line 53, "0.2540" should be -0.02540-;
Column 2, line 10, "0.01" should be -0.001-.

Signed and Sealed this

First Day of May, 2001

Attest:

NICHOLAS P. GODICI

*Attesting Officer*     *Acting Director of the United States Patent and Trademark Office*